(12) United States Patent
Hotaling et al.

(10) Patent No.: US 8,132,752 B1
(45) Date of Patent: Mar. 13, 2012

(54) BLADE STRUCTURE FOR BLENDER

(75) Inventors: Bryan Hotaling, Harvard, MA (US);
David Laduzenski, Somerville, MA (US)

(73) Assignee: Island Oasis Frozen Cocktail Company, Inc., Walpole, MA (US)

( * ) Notice: Subject to any disclaimer, the term of this patent is extended or adjusted under 35 U.S.C. 154(b) by 0 days.

(21) Appl. No.: 12/978,450

(22) Filed: Dec. 24, 2010

(51) Int. Cl.
*A47J 43/046* (2006.01)
(52) U.S. Cl. .................................. 241/282.1; 241/292.1
(58) Field of Classification Search ............... 241/282.1, 241/282.2, 292.1; 366/343, 205, 306, 307, 366/314
See application file for complete search history.

(56) References Cited

U.S. PATENT DOCUMENTS

| | | | |
|---|---|---|---|
| D488,347 S | 4/2004 | Boozer et al. | |
| 6,974,099 B2 | 12/2005 | Kolar et al. | |
| D513,685 S | 1/2006 | Katz et al. | |
| D528,859 S | 9/2006 | Boozer et al. | |
| 7,267,478 B2 | 9/2007 | Miller et al. | |
| 7,278,598 B2 | 10/2007 | Katz et al. | |
| 7,552,885 B2 | 6/2009 | Katz et al. | |
| 7,641,380 B2 * | 1/2010 | Behar et al. | 366/205 |

* cited by examiner

*Primary Examiner* — Mark Rosenbaum
(74) *Attorney, Agent, or Firm* — Lando & Anastasi, LLP

(57) ABSTRACT

A blade structure has at least three pairs of blade arms constructed and arranged to create regions of material movement in a blender cup, wherein material is moved outward and upward in a lower region near outer walls of the blender cup, material is moved upward and inward in an upper region near the outer walls of the blender cup, material is chopped and moved downward in a region partway between the outer walls and a central axis of the blender cup, and material is moved downward near the central axis of the blender cup. One embodiment of the blade structure includes a first pair of blade arms arranged in opposition about a common central axis, constructed and arranged for efficient chopping of ice; a second pair of blade arms arranged in opposition about the common central axis, constructed and arranged to move material impinging on a central part of the second pair of blade arms in a downward direction and to move material impinging on a tips of the second pair of blade arms in an upward and inward direction; and a third pair of blade arms arranged in opposition about the common central axis, constructed and arranged to move material impinging on a central portion of the third pair of blade arms in a generally downward direction and arranged to move material impinging on tips of the third pair of blade arms in an outward direction.

3 Claims, 2 Drawing Sheets

BLADE STRUCTURE FOR BLENDER

BACKGROUND OF INVENTION

The present invention is related to blender apparatus; more particularly, the invention concerns blade structures used in blenders, especially food processing blenders such as are used to prepare frozen drinks or other blended drink products.

SUMMARY OF INVENTION

Blade structures of embodiments of the present invention provide a combination of cutting, stirring, and mixing functions through the use of a plurality of blades.

According to aspects of an embodiment, a blade structure includes: at least three pairs of blade arms constructed and arranged to create regions of material movement in a blender cup, wherein material is moved outward and upward in a lower region near outer walls of the blender cup, material is moved upward and inward in an upper region near the outer walls of the blender cup, material is chopped and moved downward in a region partway between the outer walls and a central axis of the blender cup, and material is moved downward near the central axis of the blender cup. In a variation, the blade structure further includes: a first pair of blade arms arranged in opposition about a common central axis, constructed and arranged for efficient chopping of ice; a second pair of blade arms arranged in opposition about the common central axis, constructed and arranged to move material impinging on a central part of the second pair of blade arms in a downward direction and to move material impinging on a tips of the second pair of blade arms in an upward and inward direction; and a third pair of blade arms arranged in opposition about the common central axis, constructed and arranged to move material impinging on a central portion of the third pair of blade arms in a generally downward direction and arranged to move material impinging on tips of the third pair of blade arms in an outward direction. In another variation, the blade structure further includes: the first pair of blade arms having a first shape; the second pair of blade arms having a second shape; and the third pair of blade arms having a third shape; the first shape, the second shape, and the third shape different from each other. In yet a further variation, the structure includes: on each arm of the first pair of blade arms, a first leading, beveled cutting edge; on each arm of the second pair of blade arms, a second leading, beveled cutting edge, a trailing tab directing material on which the second pair of blade arms impinges downward, and a second arm tip winglet directing material on which the second pair of blade arms impinges upwards and inwards; and on each arm of the third pair of blade arms, a third leading, beveled cutting edge and a third arm tip winglet directing material on which the third pair of blade arms impinges upwards. In an even further variation, the first leading, beveled cutting edge defines a serrated, crescent profile leaving a large space between blade arms into which unblended material readily falls. In a different variation, the blade structure further includes: a first blade plate having a hub region with an internal edge defining a first keyed hole; a second blade plate having a hub region with an internal edge defining a second keyed hole; and a third blade plate having a hub region with an internal edge defining a third keyed hole; wherein aligning the first keyed hole, the second keyed hole and the third keyed hole aligns the first pair of blade arms, the second pair of blade arms, and the third pair of blade arms in a spaced apart configuration.

The variations are freely combinable where sensible for a particular design, as will be understood upon reading the description of the exemplary embodiments which follow.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
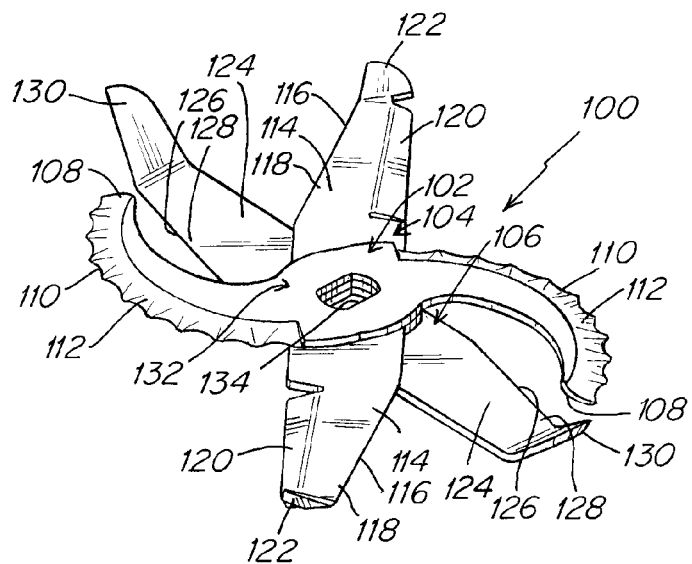
FIG. 1 is a perspective view of an illustrative blade structure.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Generally, the arrangement of blades contemplated is a multi-tiered structure that creates a blending vortex of material by moving the material in desired directions at different points within the blade structure. As will be explained, contemplated blade structures are designed to move material down in a vortex near the central axis of a blender cup in which it is used; push the material out and up near the walls of the blender cup; and then move the material back into the downward vortex.

An illustrative blender blade structure includes three distinct blade types. Two blades of each type are used, arranged in a sequential pattern of six blades. The two blades of each type are arranged symmetrically about a vertical axis of rotation. Each pair blades of the same type also are arranged to trace a different path than each blade of another type. Variations may be made using a different number of distinct blade types, a different number of blades of each type, and different sequences of the blades. Blades are conventionally arranged in opposed pairs of a same type, as described, because such pairing promotes balance of the structure, thus reducing vibration and noise during operation of the blender.

Figure 2:
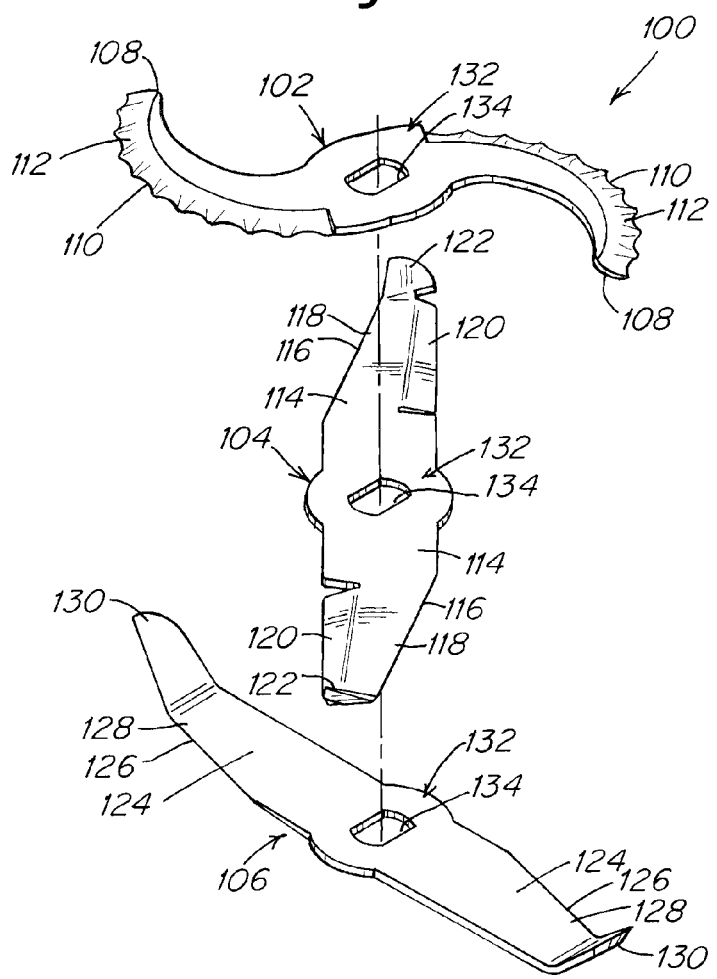
FIG. 2 is an exploded view of the blade structure of FIG. 1.

The illustrative blade structure, 100, as assembled for mounting in a blender cup is shown in FIG. 1. The same blade structure, 100, including three blade plates, 102, 104, and 106, is shown in the exploded view of FIG. 2, in which the parts of each blade plate, 102, 104, or 106, are more readily seen. This structure creates movement of material down in a vortex near the central axis of a blender cup in which it is used; pushes the material out and up near the walls of the blender cup; and then moves the material back into the downward vortex, as mentioned previously. The movement produced by this structure is designed to be smooth when the blades and cup are used with an ice-based drink such as a smoothie.

Blade plate, 102, located at the top of the assembled blade structure, 100, has two identical arms, 108, each arm, 108, having an edge, 110, sharpened into a cutting blade, 112. The cutting blade, 112, of the blade plate, 102, has a sharp, serrated, crescent profile. Serrated blades are particularly suitable for cutting tough materials while remaining relatively sharp because the serrations present a greater length of sharp edge to the material being cut than a similar blade with a smooth profile. In this exemplary embodiment, blade plate 102 has a sharp, serrated, crescent profile so as to efficiently chop ice over the entire length of the blade arms 108. The curve of blade arms 108 and the angle at which they are set relative to the other blades of the structure 100 leave a large open space before the cutting blade 112. Gravity and the action of the blade structures draw material down into this large open space. As ice is brought down into the bottom of a blender cup employing the exemplary blades by both gravity and the operation of the blade structures, the ice first encounters the efficient chopping action of blade 112. From tip to tip, blade arms 108 should have a length of about 90% of the diameter of the bottom of the blender cup in which the structure is used. A length of about 80-90% of the diameter of the bottom of the blender cup is suitable.

Blade plate, 104, located in the center of the assembled blade structure, 100, has two identical arms, 114, each arm, 114, having an edge, 116, sharpened into a cutting blade, 118, having a smooth profile. In addition, each arm, 114, has a tab, 120, bent down and a winglet, 122, bent up with a twist. The cutting blades 118 are beveled on the lower sides of arms 114, so as to direct chopped ice and other material in a generally downward direction as the blades 118 pass through the material. The tab, 120, further pushes material upon which the center of the arm, 114, impinges in a downward direction. The winglets, 122, push material upon which the outer portion of the arm, 114, impinges in a generally inward and upward direction, thus moving material that has climbed the walls of the blender cup, and is beginning to fall off of the walls, as explained in the next paragraph, into the downward vortex above the blades. Blade arms 114, from tip to tip, should also have a length of about 90% of the diameter of the bottom of the blender cup. A length of about 80-90% of the diameter of the bottom of the blender cup is suitable. The tabs 120 should have a length of about 75% of the length of each blade arm 114. Tabs 120 having lengths of about 60-80% of the length of each blade arm 114 are suitable.

Blade plate, 106, located at the bottom of the assembled blade structure, 100, has two identical arms, 124, each arm, 124, having an edge, 126, sharpened into a cutting blade, 128, having a smooth profile. In addition, each arm, 124, a winglet, 130, bent up. The blade of plate 106 is also beveled on the lower sides of arms 124, so as to direct chopped ice and other material in a generally downward direction as the blades 128 pass through the material. The winglets, 130, helps direct material upon which the outer portion of the arm, 124, impinges in a primarily outward direction. As material is pushed downward at the bottom of the blender cup and also outward towards the walls of the blender cup, it then impinges on the walls of the blender cup and is forced to climb the walls in an upward direction. Material is then caught by the winglets 122 of blade plate 104, whereby it is smoothly moved upward and inward, into the downward vortex. Blade arms 124 should have a length from tip to tip somewhat less than the length of blade arms 114 so as to allow winglets 130 to receive material pushed downward by the tabs 120 of blades 114, which is then redirected as described above.

Figure 3:
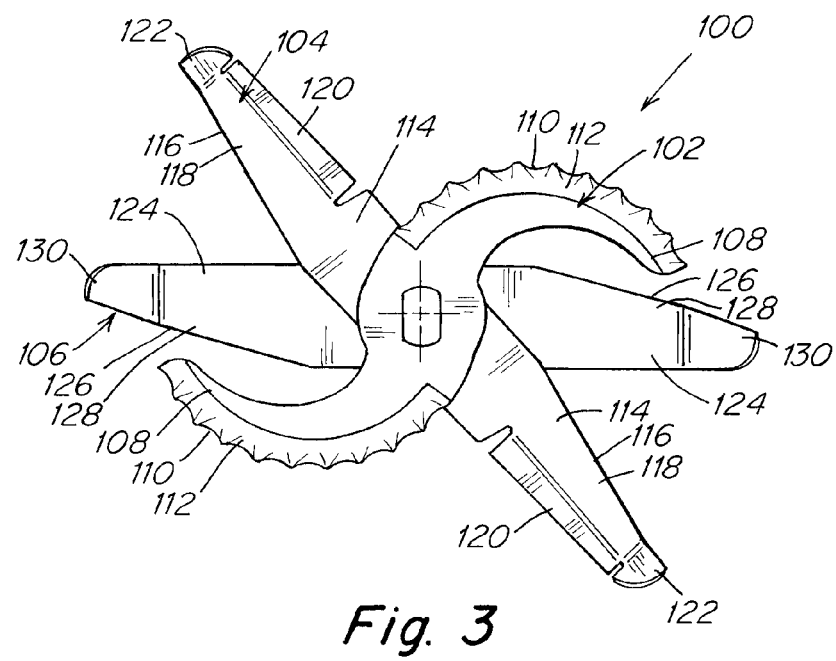
FIG. 3 is a plan view of the blade structure of FIGS. 1 and 2.

Each of the blade plates, 102, 104, and 106, has a hub region, 132. In the hub region, 132, an asymmetrical hole, 134, keyed to the shape of a drive shaft is provided. When the asymmetrical holes, 134, in each of the blade plates, 102, 104, and 106, are aligned and viewed from above, the blade structure, 100, has the plan view of FIG. 3. The illustrative structure has arms, 108, 114, and 124, arranged in a spaced apart configuration when the asymmetrical holes, 134, are aligned.

Figure 4:
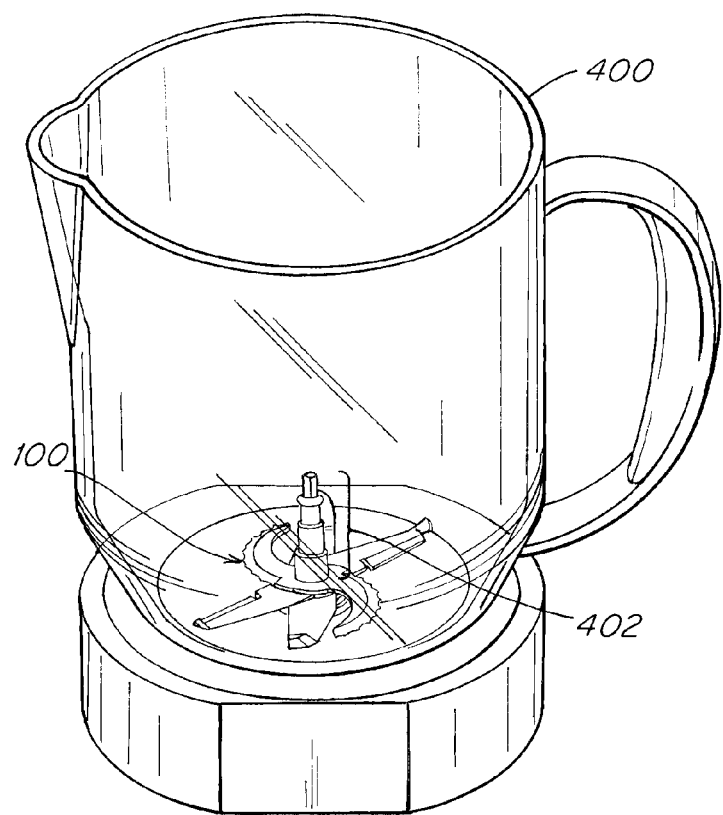
FIG. 4 is a perspective view of the blade structure of FIGS. 1, 2, and 3, mounted for use in a blender cup.

As shown in FIG. 4, in use, the hole, 134, in the blade structure, 100, is located over the drive shaft (unseen) in a blender cup 400. The structure may be secured to the drive shaft, for example, by threading that portion of the drive shaft extending through the blade structure, 100, and applying a nut to the threaded shaft, such as the measuring nut, 402, shown. An example of such a mounting is described in US Patent Application Publication No. 2006-0193200 A1, incorporated by reference, herein, in its entirety. Other suitable mounting designs known in the art for attaching a structure to a drive shaft can be used.

Aspects of embodiments can further be characterized by all of the blade arms being kept to a very low profile, with minimal upward bent sections. These aspects are among those by which the invention consistently blends small volumes of ice and drink mix. As a result, aspects of embodiments work equally well for small and large drink volumes, in both small and large blender cups.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A blade structure comprising:

at least three pairs of blade arms constructed and arranged to create regions of material movement in a blender cup, the at least three pairs of blade arms being further constructed and arranged to move material outward and upward in a lower region near outer walls of the blender cup, to move material upward and inward in an upper region near the outer walls of the blender cup, to chop and move material downward in a region partway between the outer walls and a central axis of the blender cup, and to move material downward near the central axis of the blender cup, the at least three pairs of blade arms including a first pair of blade arms arranged in opposition about a common central axis, constructed and arranged for efficient chopping of ice, the first pair of blades having a first shape, each arm of the first pair of blade arms having a first leading, beveled cutting edge, a second pair of blade arms arranged in opposition about the common central axis, constructed and arranged to move material impinging on a central part of the second pair of blade arms in a downward direction and to move material impinging on tips of the second pair of blade arms in an upward and inward direction, the second pair of blade arms having a second shape, each arm of the second pair of blade arms having a second leading, beveled cutting edge, a trailing tab directing material on which the second pair of blade arms impinges downward, and a second arm tip winglet directing material on which the second pair of blade arms impinges upwards and inwards, and a third pair of blade arms arranged in opposition about the common central axis, constructed and arranged to move material impinging on a central portion of the third pair of blade arms in a generally downward direction and arranged to move material impinging on tips of the third pair of blade arms in an outward direction, the third pair of blade arms having a third shape, each arm of the third pair of blade arms having a third leading, beveled cutting edge and a third arm tip winglet directing material on which the third pair of blade arms impinges upwards, wherein the first shape, the second shape, and the third shape are different from each other.

2. The blade structure of claim 1, the first leading, beveled cutting edge defining a serrated, crescent profile leaving a large space between blade arms into which unblended material readily falls.

3. The blade structure of claim 1, further comprising:

a first blade plate having a hub region with an internal edge defining a first keyed hole;

a second blade plate having a hub region with an internal edge defining a second keyed hole; and a third blade plate having a hub region with an internal edge defining a third keyed hole;

wherein aligning the first keyed hole, the second keyed hole and the third keyed hole aligns the first pair of blade arms, the second pair of blade arms, and the third pair of blade arms in a spaced apart configuration.

\* \* \* \* \*